United States Patent [19]

Ames

[11] Patent Number: 4,932,511
[45] Date of Patent: Jun. 12, 1990

[54] ROTARY TRAVEL LIMIT STOP APPARATUS

[75] Inventor: John E. Ames, Spring Lake, Mich.

[73] Assignee: Sundstrand Corporation, Rockford, Ill.

[21] Appl. No.: 360,509

[22] Filed: Jun. 2, 1989

[51] Int. Cl.[5] .................. F16D 71/00; F16D 65/14
[52] U.S. Cl. .................. 192/139; 188/134; 192/7
[58] Field of Search .................. 192/7, 139; 188/134; 74/10.2

[56] References Cited

U.S. PATENT DOCUMENTS

| | | | |
|---|---|---|---|
| 2,356,167 | 8/1944 | McKelvey | 192/139 XR |
| 2,823,561 | 2/1958 | Opocenski . | |
| 3,147,629 | 9/1964 | Michalec . | |
| 3,203,262 | 8/1965 | Beer . | |
| 3,662,610 | 5/1972 | Thoen . | |
| 4,064,981 | 12/1977 | House et al. . | |
| 4,641,737 | 2/1987 | Gillingham et al. . | |
| 4,721,196 | 1/1988 | Layer et al. . | |

Primary Examiner—Rodney H. Bonck
Attorney, Agent, or Firm—William D. Lanyi

[57] ABSTRACT

A rotary travel limit stop is provided for the purpose of providing positive mechanical stops for rotating machinery. Second and third rotatable members are arranged in gear mesh relation with a first rotatable member. The second and third rotatable members are provided with unequal numbers of teeth so that rotation of the first rotatable member will cause the second and third rotatable members to rotate at different rotational speeds. This, in turn, causes relative rotational movement to occur between the second and third rotatable members. A movable stop member is provided in movable relation with the second rotatable member and this movable stop member is disposed in sliding contact with an annular groove of the third rotatable member. The annular groove is provided with ramps which cause the movable stop member to move away from the third rotatable member during a portion of its rotation after the second rotatable member has rotated a predetermined number of revolutions. The axial movement of the movable stop member which is caused by the ramp portions of the annular groove caused the movable stop member to move into physically interfering relation with a fixed stop member, thus causing the entire mechanism to come to a stop when the movable stop member moves into contact with a fixed stop member.

20 Claims, 6 Drawing Sheets

ROTARY TRAVEL LIMIT STOP APPARATUS

FIELD OF THE INVENTION

The present invention is related generally to an apparatus for providing a stop mechanism for rotating machinery and, more specifically, to an apparatus which provides three rotatable members which cooperate to move a movable stop member into physically interfering relation with a fixed stop member following a predetermined number of revolutions of one of the three rotatable members.

DESCRIPTION OF THE PRIOR ART

Many devices are known to those skilled in the art for the purpose of stopping machinery after the machinery experiences a predetermined number of revolutions of its components or, alternatively, following an axial movement of a component along a predefined distance. U.S. Pat. No. 4,721,196, which issued to Layer et al on Jan. 26, 1988, describes an overtravel stop for a rotary shaft. The overtravel stop includes a fixed stop having at least a pair of stop jaws disposed at different radii from the axis of the rotary shaft. A follower member is provided about the rotary shaft and is adapted to rotate with the shaft within a selected travel limit. The follower member is associated with a stop member having at least a pair of stop jaws disposed at the same different radii as the stop jaws with the fixed stop. The follower member is rotationally shiftable with respect to the shaft when the shaft reaches its travel limit. The stop member is actually movable into engagement with the fixed stop when the follower member rotationally shifts relative to the shaft. At least some of the stop jaws have negative rake angles and a shock absorber is provided behind the fixed stop.

U.S. Pat. No. 2,823,561, which issued to Opocenski on Feb. 18, 1958, describes a hunting tooth stop structure. The structure represents an improvement in the field of rotation limiting devices and uses two cams or hunting teeth of certain shapes associated with two meshing gears having differing numbers of teeth. One of the meshing gears is driven by the shaft to be limited in its rotational range and the difference in the number of gear teeth causes a continuous change in the relative angular relation between the two gears during rotation. The cams are shaped so that in certain relative positions the two gears may rotate freely while at either end of desired range the cam members will engage each other and prevent further movement in that direction.

U.S. Pat. No. 3,203,262, which issued to Beer on Aug. 31, 1965, describes a limited multiple turn rotary mechanism which utilizes a multiturn limit mechanism comprising first, second and third rotary means with the second and third rotary means each drivingly engaging the first rotary means. The turns ratio between the first and second rotary means is made to differ from that between the first and third rotary means. First and second means are mounted off center on the second and third rotary means, respectively, for rotation therewith and the third means is mounted on the first rotary means for rotation therewith so that the limits are defined by the simultaneous reaction between the third means and the first and second means.

U.S. Pat. No. 3,662,610, which issued to Thoen on May 16, 1972, describes a multiturn limit stop apparatus which comprises a high turns ratio limit stop mechanism which, in turn, comprises a pinion, a gear in engagement with the pinion and stop members affixed to the pinion end gear. The ratio of the number of gear teeth to the number of pinion teeth is not an integer. The stop member affixed to the pinion extends beyond the periphery of the pinion and sweeps out an epitrochoidal path with respect to the gear pitch circle as it rotates. The stop member affixed to the gear is positioned inside the gear pitch circle. Since the ratio non-integral, the epitrochoidal loops of the pinion stop member rotate with respect to the gear pitch circle on each gear revolution. Rotation in one direction is limited when the epitrochoidal path for the pinion stop member on a particular rotation contacts the gear stop member.

U.S. Pat. No. 3,147,629, which issued to Michalec on Sept. 8, 1964, describes a multiturn stop apparatus. The stop apparatus comprises first and second gears mounted for independent rotation about a common axis and axially spaced a short distance apart. These gears are mechanically interconnected by auxiliary gearing, the various ratios being selected so that the first and second gears rotate at different rates. In the simplest form, the second gear may have one more tooth than the first while the auxiliary gearing may be a single pinion meshing with both. Each gear has a small protuberance or block fastened to that side which is adjacent to the other gear, the blocks being positioned at substantially equal radial distances from the common axis. A locking means such as a multifinger arm or a star wheel is pivoted about an axis parallel to the common axis and is so placed that one lobe always extends between the gears into the path of movement of the blocks. When the blocks are widely displaced circumferetially, rotation of the gears causes each block to engage a lobe of the blocking means, push it out of the way, and pass by at the same time bringing another lobe into the position just vacated by the first lobe. Each revolution of the gears brings the blocks closer together by one gear tooth space until a point is reached at which engagement of one lobe by the first block causes the next lobe to abut the second block, thereby providing a positive stop.

U.S. Pat. No. 4,064,981, which issued to House et al on Dec. 27, 1977, describes a limit stop mechanism which is provided with fine small angle threads to permit the limit stop to operate with devices requiring a large number of revolutions and yet comply with limited space and weight requirements. Jamming is prevented by utilizing a two-part traveling nut structure so that the limit stop comprises a pair of concentric jack screws. The inner jack screw consists of an inner portion of the traveling nut and the driven shaft, having fine threads to prevent a large number of revolutions. Travel of the outer jack screw is limited to prevent interference with operation of the limit stop apparatus during normal operation.

U.S. Pat. No. 4,641,737, which issued to Gillingham et al on Feb. 10, 1987, describes a bi-directional overtravel stop for a rotating shaft which is provided with a fixed stop and a stop member about the shaft and adapted for axial motion thereon to engage the thick stop. A cam structure is provided to axially move the stop member into engagement with the fixed stop when either travel limit of the shaft is reached. The cam structure is actuated to axially move the stop member in response to the rotational shifting of a member relative to the shaft. The rotational shifting is accomplished by the use of two gear pairs having different gear ratios where one set of corresponding gears in the different pairs rotate together within the shaft travel limits, causing different relative rotation of the other two gears until the travel limits are reached.

Co-pending patent application Ser No. 360508 (B03153), which is assigned to the assignee of the present application, discloses a rotary travel limit stop apparatus which provides a positive mechanical stop for rotating machinery. Three rotatable members are arranged in gear mesh relation with the second and third rotatable members being arranged in mesh with the first rotatable member. The second and third rotatable members are provided with unequal numbers of teeth so that they rotate at different rates in response to rotation of the first rotatable member. The different rates of rotation of the second and third rotatable members result in an axial movement away from each other by the second and third rotatable members when a cam structure is positioned at a preselected relative location as a result of a relative rotation between the second and third rotatable members. This axial movement of the second and third rotatable members away from each other causes movable stop pins or protuberances to move into interfering relation with fixed stop pins or protuberances. During the following revolution of the second and third rotatable members, the stop pins or protuberances move into contact with each other and stop subsequent rotation of the fixed stop member.

SUMMARY OF THE INVENTION

A rotary travel limit stop apparatus made in accordance with the preferred embodiment of the present invention comprises first, second and third rotatable members with each being arranged to rotate about an axis of rotation. The first and second rotatable members are associated together to rotate about their respective axes in a coordinated manner, wherein the rotational speed of the second rotatable member is related to the rotational speed of the first rotatable member by a first ratio. A most common application of the present invention would incorporate first and second rotatable members which are gears that are associated in mesh relation with each other. In a preferred embodiment of the present invention, the first and third rotatable members are associated to rotate about their respective axes in a coordinated manner with the rotational speed of the third rotatable member being related to the rotational speed of the first rotatable member by a second ratio. In a most common application of the present invention, both the first and third rotatable members are gears which are associated in mesh relation with each other. The first and second ratios are unequal to each other and, in a typical application of the present invention, these different ratios are achieved by providing a different number of gear teeth on each of the second and third rotatable members which are, in turn, both associated in gear mesh relation with the first rotatable member, or gear.

The present invention additionally provides a movable stop member that is movably associated with the second rotatable member for rotation about the axis of rotation of the second rotatable member. The movable stop member can be a pin that is received in sliding relation by the second rotatable member at a position which is radially offset from the center of rotation of the second rotatable member. A fixed stop member is provided in a preferred embodiment of the present invention and, in a most preferred embodiment of the present invention, the fixed stop member is rigidly attached to a housing structure which is shaped to receive the first, second and third rotatable members in bearing support relation therein. A means is provided for causing the movable stop member to move into physically interfering relation with the fixed stop member following a predetermined number of revolutions of the second rotatable member from a reference position. This causing means is associated with the third rotatable member and, in a preferred embodiment of the present invention, comprises an annular groove in the third rotatable member which extends partially around the axis of rotation of the third rotatable member. The annular groove is provided with a portion which comprises a ramp that acts as a transition from the deepest portion of the annular groove to the portion of the third rotatable member which lacks the groove or contains only a very shallow groove. The annular groove is shaped to receive the movable stop member in sliding relation therein. The difference between the first and second ratios causes the second and third rotatable member to rotate at different rotational speeds and, therefore, to move rotationally relative to each other This relative rotation between the second and third members causing the movable stop member to encounter different portions of the annular groove as the second and third rotatable members are caused to rotate by their mutual gear mesh association with the first rotatable member. Eventually, the ramp portion of the annular groove will cause the movable stop member to move axially away from the plane of the third rotatable member and into physically interfering relation with the fixed stop member. When this occurs, the physical interference between the movable stop member and the fixed stop member will prevent further rotation of the second rotatable member.

BRIEF DESCRIPTION OF THE DRAWINGS

The present invention will be more fully understood by a reading of the description of the preferred embodiment in conjunction with the drawing, in which.

DESCRIPTION OF THE PREFERRED EMBODIMENT

Figure 1:
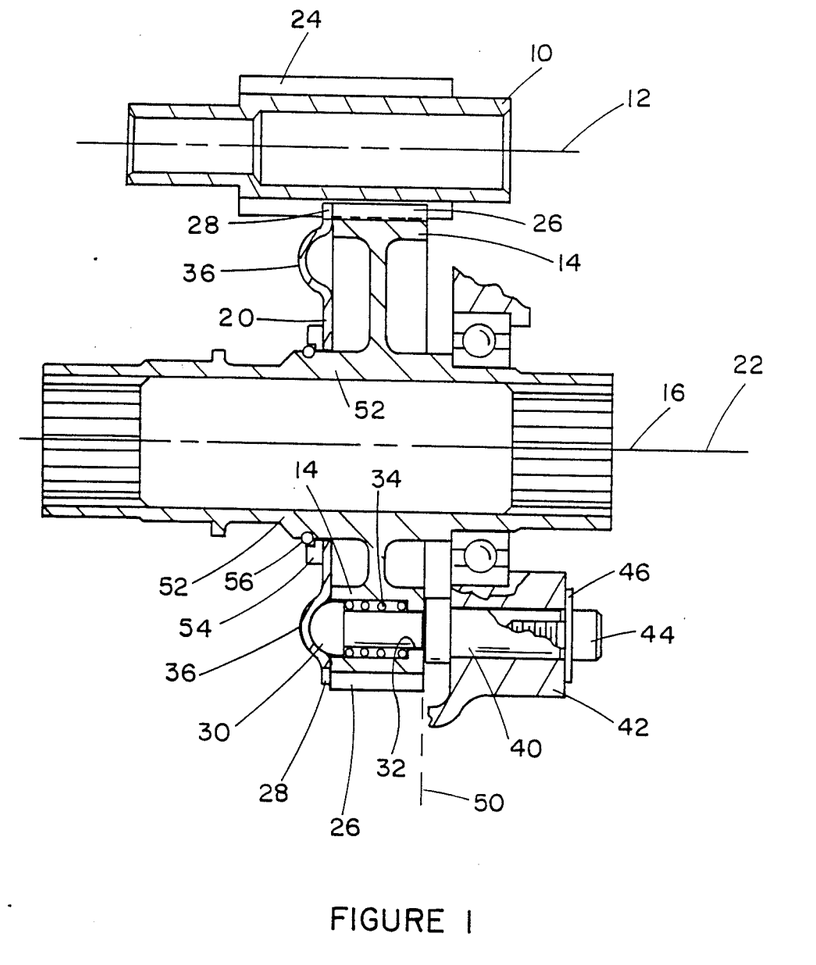
FIG. 1 illustrates a portion of a gearbox comprising the first, second and third rotatable members of the present invention.

Throughout the description of the preferred embodiment, like elements will be identified by like reference numerals. FIG. 1 illustrates a preferred embodiment of the present invention in which a first rotatable member 10 is arranged to rotate about a first axis of rotation 12. A second rotatable member 14 is arranged to rotate about a second axis of rotation 16 and a third rotatable member 20 is arranged to rotate about a third axis of rotation 22. As can be seen in FIG. 1, the second axis of rotation 16 and the third axis of rotation 22 are coincident with each other in a preferred embodiment of the present invention.

The first rotatable member 10 is provided with a plurality of gear teeth 24 which are associated in mesh relation with a plurality of gear teeth 26 of the second rotatable member 14. In addition, the third rotatable member 20 is provided with a plurality of gear teeth 28 which are associated in gear mesh relation with the gear teeth 24 of the first rotatable member 10. It should be understood that the number of gear teeth 28 is unequal to the number of gear teeth 26. Therefore, as the gear teeth 24 of the first rotatable member 10 rotate about the first axis of rotation 12, the second rotatable member 14 and the third rotatable member 20 will rotate about their respectable axes of rotation, 16 and 22, at different rotational speeds.

A movable stop member 30 is associated with the second rotatable member 14. More specifically, the second rotatable member 14 is shaped to receive the movable stop member 30 in movable relation therewith. The movable stop member 30 is disposed in a bore 32 which is formed in the second rotatable member 14. Within the bore 32, a spring 34 is provided to exert a force against the movable stop member 30 in a direction toward the left in FIG. 1.

The third rotatable member 20 is provided with an annular groove 36 which extends partially around the third axis of rotation 22. The annular groove 36 is shaped to receive the movable stop member 30 in sliding relation therein and, as will be described in greater detail below, is shaped to cause the movable stop member 30 to move away from the plane of the third rotatable member 20 when the second rotatable member 14 and the third rotatable member 20 are associated in a specific relative rotational position with respect to each other. A fixed stop member 40 is also provided. In a preferred embodiment of the present invention, the fixed stop member 40 is rigidly attached to a housing structure 42 and, additionally, the housing structure 42 (not shown completely in FIG. 1) is shaped to receive the first, second and third rotatable members in bearing support relation for rotation about their respective axes. In the preferred embodiment of the present invention illustrated in FIG. 1, the fixed stop member 40 is held in position by a threaded member 44 in cooperation with a washer 46.

The rightmost end of the movable stop member 30 is positioned at a location, indicated by dashed line 50, which does not interfere with the fixed stop member 40 during normal operation as the second rotatable member 14 rotates about its axis of rotation 16. However, it should be apparent that a movement of the rotatable stop member 30 in a direction toward the right in FIG. 1 will cause the rightmost end of the rotatable stop member 30 to move to the right of the dash line 50 and into physical interference with the fixed stop member 40. In FIG. 1, both the right end of the movable stop member 30 and the left end of the fixed stop member 40 are shown as extending to the dashed line 50. However, it should be understood that a minimal amount of clearance is provided between the movable stop member 30 and the fixed stop member 40 during normal rotation of the second rotatable member 14. The third rotatable member 20, in a preferred embodiment of the present invention, is disposed around the shaft 52 which supports the second rotatable member 14. The third rotatable member 20 is held in position by a retaining ring 54 and a snap ring 56. It should be understood that the third rotatable member 20, while being positioned on the shaft 52 of the second rotatable member 14, is free to rotate relative to the shaft 52. It should further be understood that the second rotatable member 14 and the third rotatable member 20 are not rigidly attached together but, instead, are arranged in such a way that they can rotate relative to each other. Since both the second rotatable member 14 and third rotatable member 20 are arranged in gear mesh relation with the first rotatable member 10, and are provided with different numbers of gear teeth, a rotation of the first rotatable member 10 about its axis of rotation 12 will cause the second 14 and third 20 rotatable members to rotate at different relative speed about their respective axes of rotation.

Figure 2:
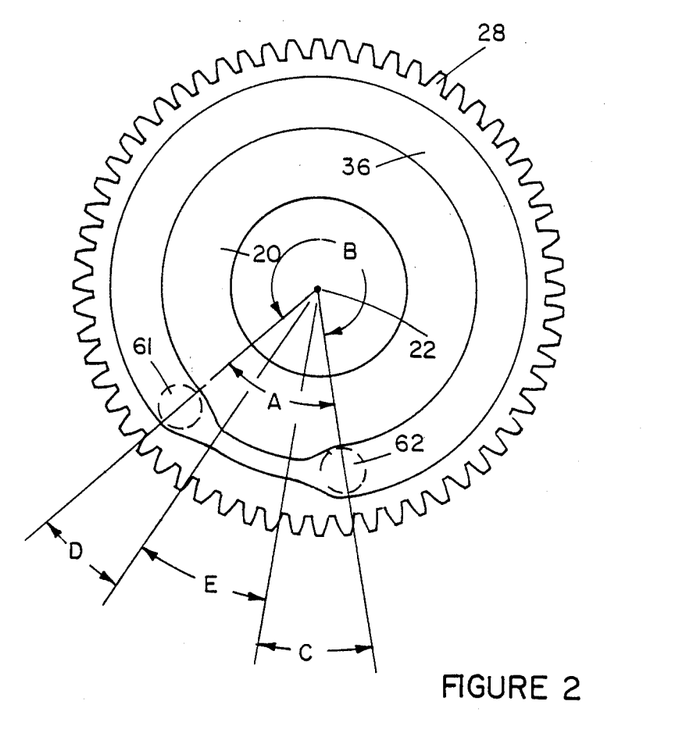
FIG. 2 illustrates the third rotatable member of the present invention.

With reference to FIG. 2, the third rotatable member 20 is shown with its annular groove 36 extending partially around its axis of rotation 22, which is shown as a point in FIG. 2. As described above, the annular groove 36 extends at full depth around the axis of rotation 22 only around the portion of the third rotatable member 20 which is shown by angular distance B in FIG. 2. Angular distances C and D represent the ramp portions of the annular groove 36 where the depth of the annular groove tapers from full depth to almost no depth. This portion of virtually no depth continues along the angular distance designated by E in FIG. 2. Therefore, it should be understood that the annular groove 36 extends at full depth along the angular distance illustrated by B in FIG. 2 and at a depth less than full depth along the angular distance designated by A in FIG. 2. As illustrated by dashed circles 61 and 62 in FIG. 2, the rounded portion of the movable stop member 30 can slide in the full depth portion of the annular groove 36 between location 61 and location 62 along the path distance B without being caused to move axially away from the plane of the third rotatable member 20. However, when the rounded portion of the movable stop member 30 encounters region C or region D of the annular groove 36, the ramp portion of the annular groove will cause the movable stop member 30 to move axially relative to the third rotatable member and, as illustrated in FIG. 1, through the opening 32 in the second rotatable member 14 while compressing the spring 34 and moving into physically interfering association with the fixed stop member 40.

Figure 3:
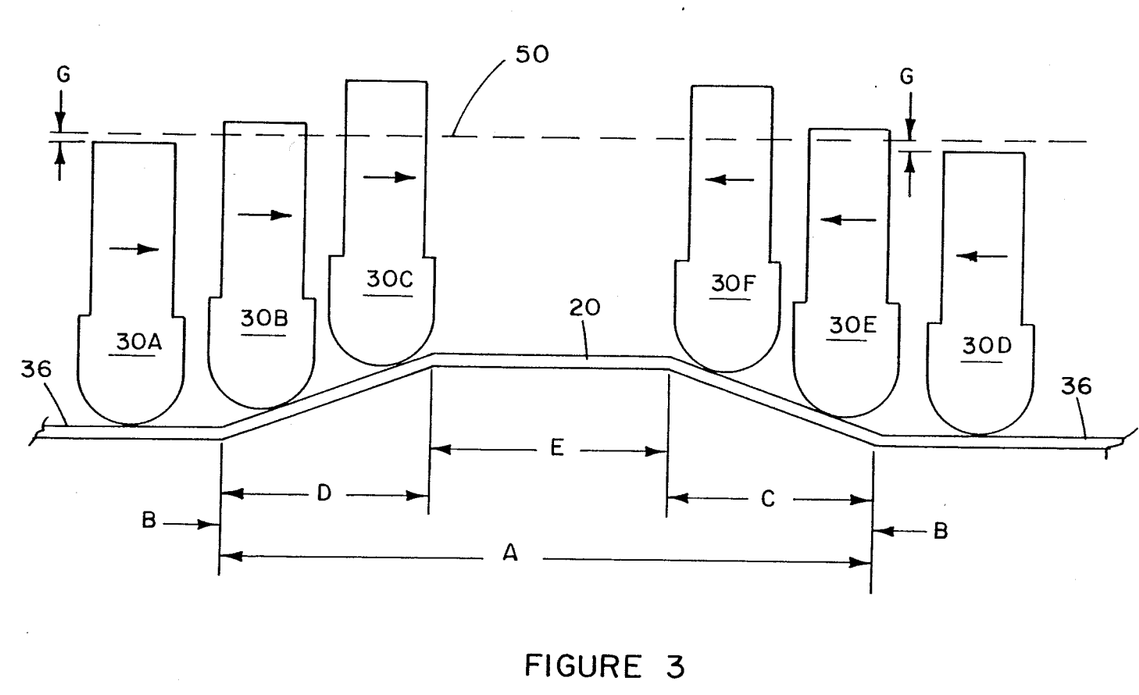
FIG. 3 is a schematic representation of the relationship between the annular groove and the moveable stop member of present invention.

FIG. 3 illustrates a rollout view of the portion of FIG. 2 that extends generally from position 61 to position 62. The purpose of the illustration in FIG. 3 is to illustrate the dynamic relationship between the third rotatable member 20 and the movable stop member 30. As the relative rotation between the second rotatable member 14 and the third rotatable member 20 takes place, the head of the movable stop member 30 slides in the annular groove 36 of the third rotatable stop member and, as the movable stop member 30 slidably moves into contact with the ramp portions, C or D, of the annular groove 36, it is forced to move axially away from the third rotatable member 20 and its rightmost end, shown in FIG. 1, is caused to move past the dashed line 50. It should be understood that the dashed line 50 represents the rightmost end of the movable stop member 30 and, also, the leftmost end of the fixed stop member 40. However, it should further be understood that in a preferred embodiment of the present invention, a small clearance is actually provided between the movable stop member 30 and the fixed stop member 40 to assure that the movable stop member 30 can move past the fixed stop member 40 with clearance when the head of the movable stop member 30 is in the maximum depth portion of the annular groove 36. For example, in FIG. 3, the movable stop member 30, when at the position identified by reference 30A is provided with a gap G between its end and the operative end of the fixed stop member 40. This clearance G is provided as long as the movable stop member 30 is in the portion of the annular groove 36 identified by the distance B. As the movable stop member 30 moves into the ramp portion of the annular groove, identified by reference numeral D, it is caused to move in a direction generally away from the third rotatable member 20 and into physically interfering relation with the fixed stop member 40, as represented by dashed line 50 in FIG. 3. As the movable stop member moves farther up the ramp, it moves into even more physically interfering relation with the fixed stop member 40 as indicated by reference numeral 30C in FIG. 3. If, after extending past dashed line 50, the movable stop member 30 is rotated into the position occupied by the fixed stop member 40, the two stop members will move into physical contact with each other and the mechanism shown in FIG. 1 will be caused to stop. The description of the operation of the preferred embodiment of the present invention shown in FIG. 3 contemplates the relative movement of member 20 from right to left in the Figure with respect to the movable stop member 30, as illustrated by the sequence of positions identified by reference numeral 30A, 30B and 30C.

FIG. 3 also illustrates the operation of the present invention when rotated in the opposite direction. As the movable stop member 30 moves through the sequence of positions identified by reference numerals 30D, 30E and 30F in FIG. 3, the gap G is similarly reduced as the movable stop member moves into contact with the ramp within the angular distance identified by C and the opposite end of the movable stop member 30 moves into physically interfering relation with the fixed stop member 40 as illustrated by dashed line 50. If the movable stop member 30 is rotated to the position occupied by the fixed stop member 40 while in this physically interfering position past the dashed line 50, it will move into contact with the fixed stop member 40 and the entire mechanism will be caused to stop.

Figure 4A:
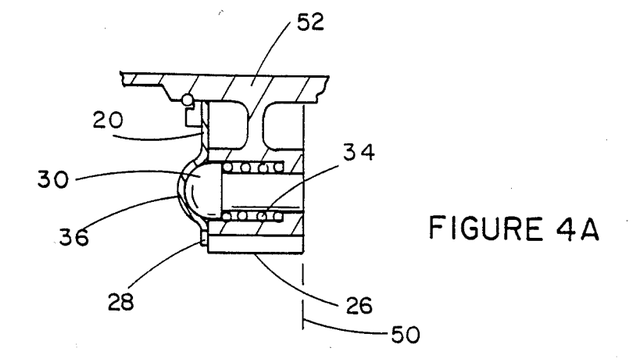
FIGS. 4A, 4B and 4C show a sequential illustration of the relationship between the annular groove, the moveable stop member and the fixed stop member of the present invention.
Figure 4B:
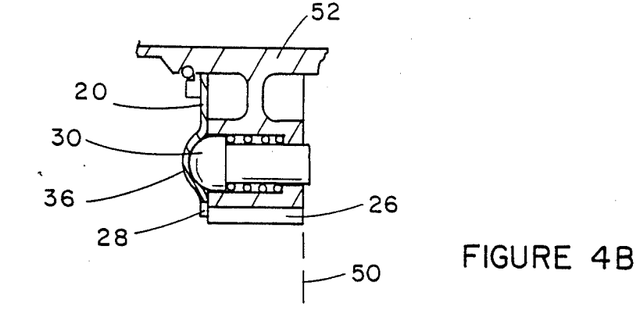
Figure 4C:
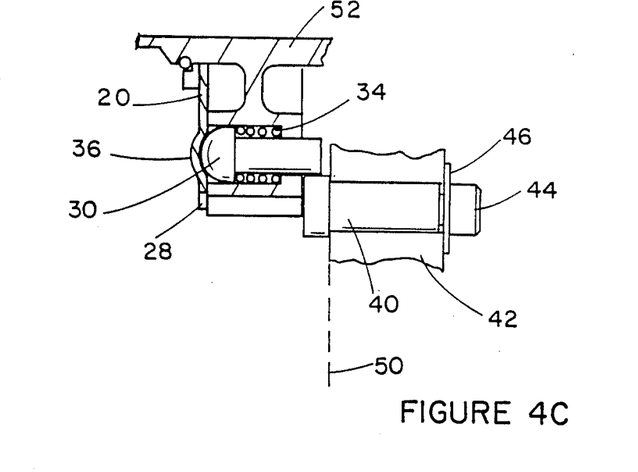

FIGS. 4A, 4B and 4C illustrate a sequence that generally corresponds with the sequence of FIG. 3 which is illustrated by reference numerals 30A, 30B and 30C or, alternately, reference numerals 30D, 30E and 30F. In FIG. 4A, the movable stop member 30 is disposed in the maximum depth portion of the annular groove 36 and the spring 34 is in its most relaxed state. In addition, the rightmost end of the movable stop member 36 is disposed in noninterfering relation with the fixed stop member 40 (not shown in the figure) and therefore does not extend to the right of dashed line 50. In FIG. 4B, the head portion of the movable stop member 30 has initially moved into the ramp portion of the annular groove, represented by distance D in FIGS. 2 and 3, and the rightmost end of the movable stop member 30 has moved toward the right of dashed line 50, indicating that it has begun to move into physically interfering relation with the fixed stop member 40 (not shown in FIG. 4B). FIG. 4C illustrates the position of the movable stop member 30 after it has moved into a more shallow portion of the annular groove 36. This position is generally equivalent to the position illustrated by reference numeral 30C in FIG. 3. As can be seen in FIG. 4C, the spring 34 is compressed and the rightmost end of the movable stop member 30 has moved to a position which extends well beyond the dashed line 50 and into physically interfering relation with the position of the fixed stop member 40. It should be understood that the fixed stop member 40 is shown radially offset (i.e. lower in FIG. 4C) from its actual position to provide a clearer illustration of the relative axial positions of the movable stop member 30 and the fixed stop member 40 which are in interfering positions in FIG. 4C.

Figure 5:
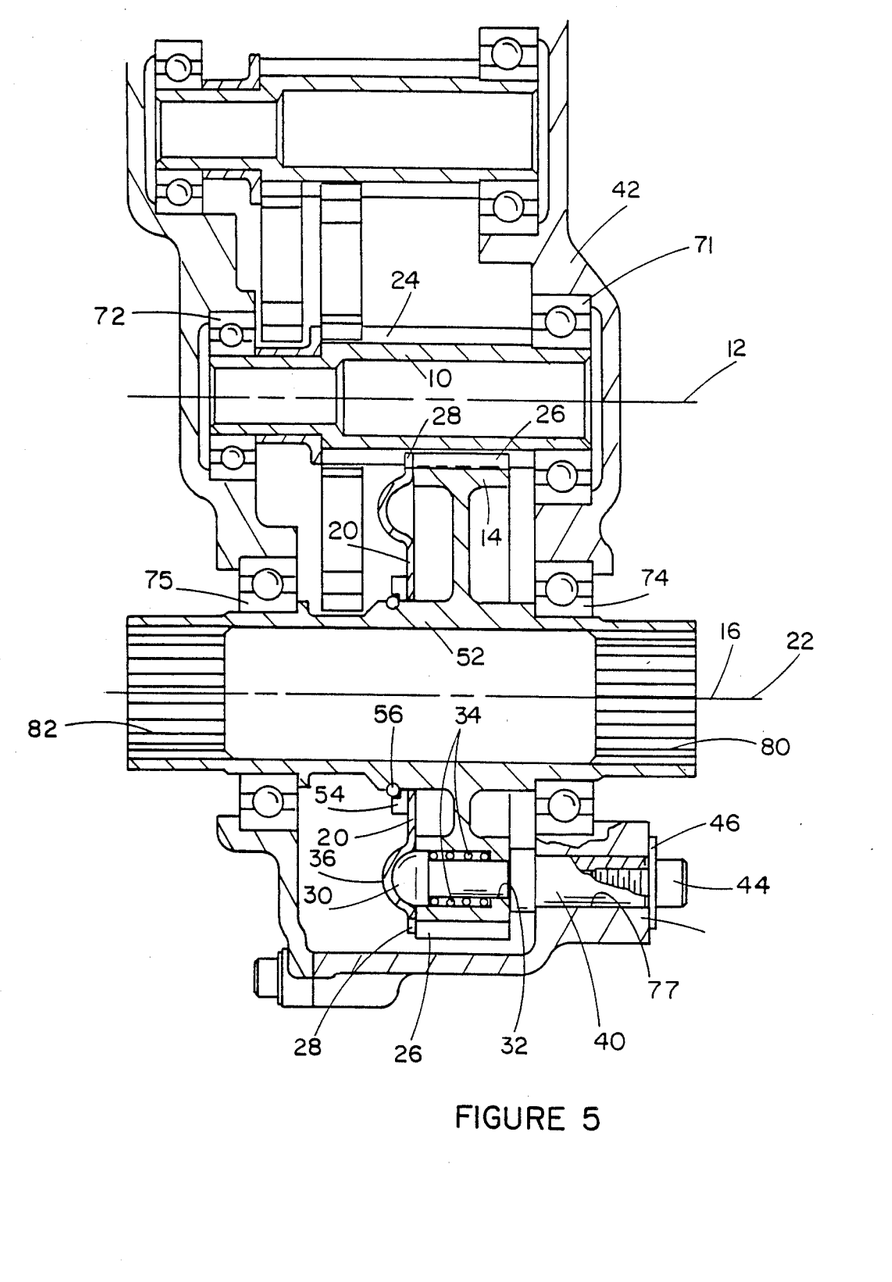
FIG. 5 illustrates a gearbox comprising the present invention.

FIG. 5 illustrates an embodiment of the present invention arranged in association with other components of a gear box. The first rotatable member 10 is supported by bearings 71 and 72 which are, in turn, supported by a housing structure 42. The second rotatable member 14 is integrally attached to the shaft 52 which is supported by bearings 74 and 75 which are, in turn, supported by the housing structure 42. The fixed stop member 40 extends through an opening 77 in the housing structure 42 and is held in place by the cooperative action of the threaded member 44 and the washer 46. In operation, an external source of driving torque is provided for the purpose of rotating the first rotatable member 10 and its gear 24 about its axis of rotation 12. The gear 24 is in mesh relation with the gear 26 and the gear 28 which are attached to the second rotatable member 14 and the third rotatable member 20, respectively. Since gear 26 and gear 28 are provided with unequal numbers of teeth relative to each other, rotation of the first rotatable member 10 will cause the second rotatable member 14 and the third rotatable member 20 to rotate at different speeds about their respective axes of rotation 16 and 22. In the preferred embodiment of the present invention illustrated in FIG. 5, the second axis of rotation 16 and the third axis of rotation 22 are arranged to be coincident with each other to permit the third rotatable member 20 to be disposed on the shaft 52 of the second rotatable member 14 as shown. As described above, it should be understood that the third rotatable member 20 is free to rotate relative to the shaft 52 as the second 14 and third 20 rotatable members move relative to each. In a preferred embodiment the present invention, the rightmost end of the shaft 52 is provided with an internal spline 80 and the leftmost end of shaft 52 is provided with an internal spline 82. These splines can be used to provide driving torque to external members.

Figure 6:
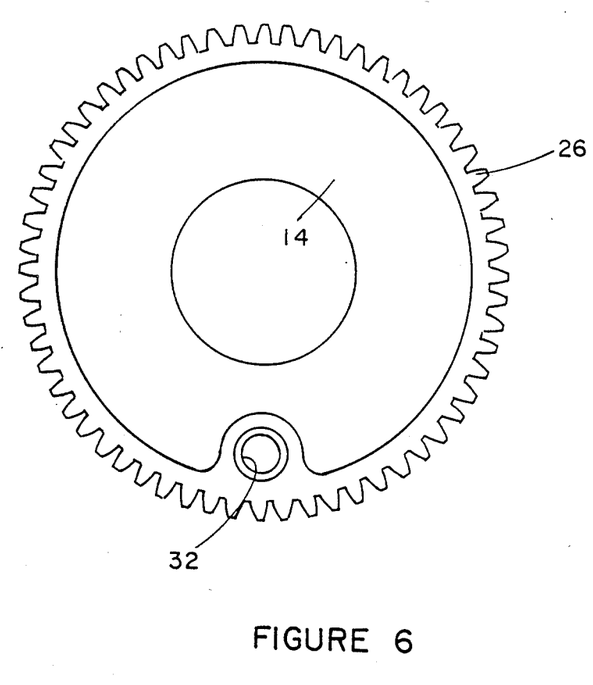
FIG. 6 illustrates the second rotatable member of the present invention.

FIG. 6 illustrates the second rotatable member 14 of the present invention. As can be seen, the second rotatable member 14 is provided with a plurality of teeth 26 around its periphery to permit the second rotatable member 14 to be arranged in mesh relation with the gear teeth 24 of the first rotatable member 10, as shown in FIGS. 1 and 5. FIG. 6 also illustrates the bore 32 which is shaped to receive the moveable stop member 30 in sliding relation therein. As illustrated in the cross section views of FIGS. 1 and 5, the bore 32 is shaped to receive both the moveable stop member 30 and the spring 34.

It is important to note that, although FIGS. 2 and 6 both show a specific number of teeth on the third rotatable member 20 and the second rotatable member 14, respectively, the numbers of teeth shown in these figures is not intended to represent the actual number of teeth used in any specific application. Instead, the gear teeth shown in FIGS. 1 and 6 are merely intended to illustrate the location where the gear teeth of these two rotatable members are provided.

To further illustrate the operation of the present invention, a specific hypothetical example will be described. In this hypothetical example, it will be assumed that the output shaft 52 is intended to rotate 24 revolutions within its operating range and, at the opposite ends of its travel, is to be stopped by the engagement of positive mechanical stop members. The second set of gear teeth 26 of the second rotatable member 14 is provided with 65 teeth and is driven by its gear mesh engagement with the gear 24 of the first rotatable member 10 which is provided with 17 teeth. In addition, the third gear 28 of the third rotatable member 20 is provided with 63 teeth. The third rotatable member 20 is restrained from axial movement by the retaining ring 54 which is held in place by the snap ring 56. However, the third rotatable member 20 is permitted to move rotationally relative to the shaft 52 and the second rotatable member 14. As described above, the third rotatable member is provided with the annular groove 36 which engages the head of the movable stop member 30 which, in turn, is caused to remain in contact with the annular groove by the force of the spring 34. During the operation of the present invention within its operating range, the head of the movable stop member 30 slides within the deepest portion of the annular groove 36. During this normal operation, the opposite end of the movable stop member 30 is disposed in clearance relation with the fixed stop member 40. Beginning with the last revolution of the normal operating range, the spherical head of the movable stop member 30 is positioned at either position 61 or position 62, as shown in FIG. 2. During the last revolution of the normal operating range, the relative rotation of the second and third members causes the spherical head of the movable stop member 30 to ride up either ramp D or ramp C, depending on the direction of rotation of the device shown in FIG. 5. Since these ramps will cause the movable stop member 30 to move into physically interfering relation with the fixed stop member 40, the movable and fixed stop members will move into engagement with each other during the next revolution of the second rotatable member 14. A reversal of the rotatable members from this stop engagement position permits the movable stop member to move back down the ramp and, under the force of the spring 34, to retract sufficiently to clear the fixed stop member 40 during the next revolution and remain in this retracted position for the next 22 revolutions until, during the 24th revolution, it moves up the other ramp in the annular groove 36 to move into physically interfering relation with the fixed stop member 40.

In this hypothetical example, for 24 revolutions of the second rotatable member, with its gear 26, the first rotatable member will rotate 91.765 revolutions as determined by multiplying the number of revolutions of the second rotatable member (e.g. 24) by the number of teeth in gear 26 of the second rotatable member 14 (e.g. 65 teeth) and then dividing that result by the number of teeth of gear 24 of the first rotatable member 10 (e.g. 17 teeth). The third rotatable member 20 will rotate 24.762 revolutions as determined by multiplying the number of revolutions of the first rotatable member 10 by the number of teeth in gear 24 of the first rotatable member 10 (e.g. 17 teeth) and dividing the result by the number of teeth in gear 28 of the third rotatable member 20 (e.g. 63 teeth). This means that the second rotatable member 14 and the third rotatable member 20 will move relative to each other by 0.762 turns which is determined by subtracting the 24.0 turns of the second rotatable member from the 24.762 turns of the third rotatable member. This relative rotation of 0.762 turns is equivalent to 274.32 degrees of rotation for every 24 turns of the second rotatable member. Since the second rotatable member rotates 24 revolutions, the 274.32 degrees of relative rotation is equivalent to 11.43 degrees per turn. Therefore, the large distance indicated by reference numeral B in FIG. 2 is equivalent to 251.46 degrees which is determined by subtracting 2 times 11.43 degrees, or 22.86 degrees from the 274.32 degrees determined above. Therefore, the movable stop member 30 must be designed in association with the ramps, C and D, to move the movable stop member 30 from a noninterfering relation with the fixed stop member 40 to a physically interfering relation with the fixed stop member 40 within 11.43 degrees of travel on the two ramps of the annular groove 36.

Although the present invention has been described with specific detail and by a particular hypothetical example and, furthermore, although the present invention has been illustrated with a high degree of specificity in the drawing, it should be understood that alternative embodiments of the present invention should be considered to be within its scope.

What I claim is:

1. A rotary travel limit stop apparatus, comprising:
   a first rotatable member having a first axis of rotation;
   a second rotatable member having a second axis or rotation;
   a third rotatable member having a third axis of rotation, said first and second rotatable members being associated to rotate about their respective axes in a coordinated manner, the rotational speed of said second rotatable member being related to the rotational speed of said first rotatable member by a first ratio, said first and third rotatable members being associated to rotate about their respective axes in a coordinated manner, the rotational speed of said third rotatable member being related to the rotational speed of said first rotatable member by a second ratio, said second ratio being unequal to said first ratio; a movable stop member being movably associated with said second rotatable member for rotation about said second axis of rotation;
   a fixed stop member; and
   means associated with said third rotatable member for causing said movable stop member to move into physically interfering relation with said fixed stop member following a predetermined member of revolutions of said second rotatable member from a reference position, said causing means comprising an annular discontinuity extending partially around said third axis of rotation, said annular discontinuity being shaped to receive said movable stop member in sliding relation, said annular discontinuity being shaped to cause said movable stop member to move away from said third rotatable member when said second and third rotatable members are in a predetermined position relative to each other.

2. The apparatus of claim 1, wherein:
   said second and third axes of rotation are coincident with each other.

3. The apparatus of claim 1, wherein:
   said first, second and third rotatable members are each gears and said second and third rotatable members are each in meshing relation with said first rotatable member.

4. The apparatus of claim 3, wherein:

said second rotatable member has a number of teeth which is unequal to a number of teeth of said third rotatable member.

5. The apparatus of claim 1, further comprising:
a housing structure shaped to support said first, second and third rotatable members in bearing support relation for rotation about their respective axes.

6. The apparatus of claim 5, wherein:
said fixed stop member is rigidly attached to said housing structure.

7. A rotary travel limit stop apparatus, comprising:
a first gear having a first axis of rotation;
a second gear having a second axis of rotation;
a third gear having a third axis of rotation, said first and second gears being associated in meshing relation, said first and third gears being associated in meshing relation, said second gear having a number of teeth, said number of teeth being unequal to a number of teeth of said third gear;
a fixed stop; and
a movable stop, said second gear being shaped to receive said movable stop in movable association for rotation of said movable stop about said second axis of rotation, said third gear being shaped to cause said movable stop to move into contact with said fixed stop following a predetermined number of revolutions of said second gear from a reference position, said third gear comprising an annular groove extending partially around said third axis of rotation, said annular groove being shaped to receive said movable stop in sliding relation therein, said annular groove being shaped to cause said movable stop to move away from said third gear when said second and third gears are in a predetermined position relative to each other.

8. The apparatus of claim 7, further comprising:
a housing structure having means for supporting said first, second and third gears for rotation about their respective axes.

9. The apparatus of claim 8, wherein:
said fixed stop is rigidly attached to said housing structure.

10. The apparatus of claim 7, wherein:
said second gear has more teeth than said third gear.

11. The apparatus of claim 7, wherein:
said second gear has less teeth than said third gear.

12. The apparatus of claim 7, wherein:
said second and third axes are coincident with each other.

13. The apparatus of claim 7, wherein:
said second gear is rigidly attached to a shaft for rotation about said second axis, said third gear being disposed in movable relation on said shaft for rotation about said second axis, said third gear being rotatable relative to said second gear.

14. A rotary travel limit stop apparatus, comprising:
a first gear having a first axis of rotation
a second gear having a second axis of rotation;
a third gear having a third axis of rotation, said first gear being in mesh with said second gear, said first gear being in mesh with said third gear, said second and third tears having different numbers of teeth;
a fixed stop;
a movable stop, said second gear being shaped to receive said movable stop in movable relation for rotation of said movable stop about said second axis of rotation; and
means associated with said third gear for causing said movable stop to move into physically interfering relation with said fixed stop following a predetermined number of rotations of said second gear from a reference position, said causing means comprising an annular groove shaped in said third gear, said annular groove extending partially around said third axis of rotation, said annular groove being shaped to receive said movable stop in sliding relation, said annular groove being shaped to cause said movable stop to move away from said third gear when said second and third gears are in a predetermined relative rotational position relative to each other.

15. The apparatus of claim 14, wherein:
said causing means comprises an annular groove shaped in said third gear, said annular groove extending partially around said third axis of rotation, said annular groove being shaped to receive said movable stop in sliding relation, said annular groove being shaped to cause said movable stop to move away from said third gear when said second and third gears are in a predetermined relative rotational position relative to each other.

16. The apparatus of claim 14, wherein:
said second gear is rigidly connected to a shaft for rotation about an axis or rotation of said shaft, said third gear being associated in movable relation with said shaft for rotation about said axis of rotation of said shaft.

17. The apparatus of claim 14, further comprising:
a housing structure shaped to rotatably receive said second and third gears in bearing support relation, said fixed stop being rigidly attached to said housing structure.

18. The apparatus of claim 14, wherein:
said second gear has more teeth than said third gear.

19. The apparatus of claim 14, wherein:
said second gear has less teeth than said third gear.

20. A rotary travel limit stop apparatus, comprising:
a first rotatable member having a first axis of rotation;
a second rotatable member having a second axis or relation;
a third rotatable member having a third axis of rotation, said first and second rotatable members being associated to rotate about their respective axes in a coordinated manner, the rotational speed of said second rotatable member being related to the rotational speed of said first rotatable member by a first ratio, said first and third rotatable members being associated to rotate about their respective axes in a coordinated manner, the rotational speed of said third rotatable member being unequal to said first ratio;
a movable stop member being movably associated with said second rotatable member for rotation about said second axis of rotation;
a fixed stop member; and
means associated with said third rotatable member for causing said movable stop member to move into physically interfering relation with said fixed stop member following a predetermined member of revolutions of said second rotatable member from a reference position, said causing means being formed as a generally annular region of said third rotatable member and extending partially around said third axis of rotation, said generally annular region being shaped to receive said movable stop member in sliding relation, said generally annular region being shaped to cause said movable stop member to move away from said third rotatable member when said second and third rotatable members are in a predetermined position relative to each other.

* * * * *